(12) United States Patent
Haas

(10) Patent No.: US 7,594,604 B2
(45) Date of Patent: Sep. 29, 2009

(54) PROCESS FOR VISUALLY VALIDATING IDENTIFICATION BADGES

(75) Inventor: David J. Haas, Suffern, NY (US)

(73) Assignee: Tecco, Inc., Suffern, NY (US)

( * ) Notice: Subject to any disclaimer, the term of this patent is extended or adjusted under 35 U.S.C. 154(b) by 216 days.

(21) Appl. No.: 11/635,192

(22) Filed: Dec. 8, 2006

(65) Prior Publication Data

US 2007/0145122 A1 Jun. 28, 2007

Related U.S. Application Data

(63) Continuation-in-part of application No. 11/315,112, filed on Dec. 23, 2005.

(51) Int. Cl.
*G06K 5/00* (2006.01)
*G06K 19/06* (2006.01)
(52) U.S. Cl. .................. 235/380; 235/494; 345/204; 40/1.6
(58) Field of Classification Search ................. 235/380; 40/1.5–1.6; 340/204
See application file for complete search history.

(56) References Cited

U.S. PATENT DOCUMENTS

| 4,236,156 | A | * | 11/1980 | Eden | 345/106 |
|---|---|---|---|---|---|
| 4,236,331 | A | * | 12/1980 | Mattson | 40/1.5 |
| 4,980,679 | A | * | 12/1990 | Klaubert | 235/380 |
| 5,397,881 | A | * | 3/1995 | Mannik | 235/380 |
| 5,932,869 | A | * | 8/1999 | Gottlich et al. | 235/493 |
| 5,939,699 | A | * | 8/1999 | Perttunen et al. | 235/462.01 |
| 5,968,301 | A | * | 10/1999 | Murakami et al. | 156/230 |
| 5,993,957 | A | * | 11/1999 | Kobayashi et al. | 428/332 |
| 6,536,665 | B1 | * | 3/2003 | Ray et al. | 235/380 |
| 2002/0167500 | A1 | * | 11/2002 | Gelbman | 345/204 |

* cited by examiner

*Primary Examiner*—Seung H Lee
*Assistant Examiner*—Christle I Marshall
(74) *Attorney, Agent, or Firm*—Michael E. Zall

(57) ABSTRACT

A process for validating an identification badge or plastic card for a plurality of predetermined periods of time. The process includes generating, preferably randomly, an initial image for an initial predetermined period of time and then transmitting this initial image to a printing device. The printing device prints the image on the identification badge to thereby validate the badge for the initial predetermined period of time. Thereafter, a subsequent image is randomly generated for a subsequent predetermined period of time. This subsequent image is then transmitted to the printing device. The initial image is then removed from the identification badge and the subsequent image printed on the identification badge to validate the badge for the subsequent predetermined period of time.

13 Claims, 8 Drawing Sheets

PROCESS FOR VISUALLY VALIDATING IDENTIFICATION BADGES

RELATED APPLICATIONS

This application is a Continuation-In-Part (CIP) application of U.S. Ser. No. 11/315,112 filed on Dec. 23, 2005, now pending, the entire disclosure of which is incorporated herein by reference. Reference is also made to Disclosure Document No. 605198 filed on Aug. 28, 2006, Disclosure Document No. 591025 filed on Dec. 7, 2005 and Disclosure Document No. 604256 filed on Aug. 2, 2006, the entire disclosures of which are incorporated herein by reference.

BACKGROUND OF THE INVENTION

1. Field of the Invention

The present invention relates to a process for repeatedly validating a reusable identification badge or pass for predetermined periods of time. In particular, this invention provides a process for providing a clearly visible printed initial image, e.g., text or symbol, on an identification card (badge), removing such initial image and then coding such badge again with a subsequently generated image.

More particularly, the invention relates to a process that may be used on numerous type substrate identification cards, particularly plastic identification cards, without the need for a specific type substrate material and/or substrate preparation, for repeatedly applying and removing a durable image code in the same area on an identification badge or pass.

2. Related Art

Given the present state of the art, the typical procedure is for companies to change employee identification badges once a year so that invalid identification badges are eliminated. However, this still means that an unauthorized person could use a visually valid badge for, say a year, until it is replaced. An ideal security system would provide identification badges that are validated continuously, e.g., every minute. However, the present state of the art makes such an update system impractical. However, it is relatively practical to have each employee validate their identification badge every day. Such daily validation substantially enhances the security of a facility by reducing the window for use of invalid badges to be at most only one day.

Since validation dates are predictable, they are not a useful security means. Ideally, a daily validation system would employ a different image code, preferably randomly generated, associated with the specific date of use. Generally, generation of such a random code is known in the art and can be readily accomplished through known hardware and software.

A major obstacle in instituting, for example, a daily validation system, is in printing the image code and/or associated date on all the different type identification badges used at a facility or group of facilities and organizing the logistics of having all the employees or authorized visitors pass through the validating stations at various times during the day. This is further complicated by the fact that such visitors or employees can enter and leave at various times through various entrances and exits. This is still further complicated by the fact that the employees and visitors carry their identification badges in various type holders and by various means.

Within a facility, the human eye is typically the only "sensor" for reading identification badges. After passing through the entrance access portal of the facility where the electronic component of the access card is read, the identification badge is purposely worn so that other people can see and read it. However, except for the large printing and design colors, identification badges must be examined at close distances in order for the human eye to see the details. In particular, without close-up inspection, most of the visual data cannot be read, the visual authentication indicia on the face of the badges cannot be seen, and tampering with the credential cannot be detected. Thus, it is almost impossible for a person to confirm that an identification credential is valid from a distance of more than 50 cm.

Until now, Applicant is not aware of any commercially practical means for providing daily visual updates or validation indicators for identification badges, particularly when the badges are not manufactured by the security department of the facility in which they are used. For example, many facilities permit contractors and employees from other companies to wear their own company-issued identification badges while in the facility. Since these badges may be manufactured and printed in ways other than that used by the facility, they will appear completely different from the facility issued badges and thus, would not be recognized as valid identification badges. Even CCTV cameras viewing non-standard badges can provide a false reading. Another problem is that if an employee is in the facility wearing their identification badge that is visually valid, yet electronically void, the CCTV camera may not be able to identify this particular problem.

Historically, any printing on plastic and non plastic cards is intended to be permanent. Typically, plastic identification cards, such as credit cards and badges, are issued with security and quality in mind. Thus, the printing on the card and the card itself is very rugged and durable. Thus, once the card is manufactured, it is intended to be almost impossible to change or alter any part of it. For security reasons these cards are designed to thwart altering and changing the data on the card. The visual appearance of these cards remains unaltered throughout its entire life, independent of the card's status such as expiring or even if the card is purposely voided because the credit card account was closed or compromised by theft. Thus, one cannot change the visual validity of the card, and it is for this reason that the cards usually contain an electronic component which is electronically read when the card is presented for use.

In most instances, the user of an identification card will wear their card so that it is visible to people in the facility where they are located. For example, a person may be required to wear their identification badge at all times while they are in a facility, but this identification card may have been manufactured years before. There is currently no means to provide a visual indicator on an identification badge to show everyone who looks at it that the identification card is valid today and that the person wearing it is authorized to be in the facility today. Whereas a guard may be required to look at the identification badge when the person enters the facility at an access control portal, the guard will normally rely on the electronic reading that verifies that the card is valid and that the person is authorized to enter the facility.

Once inside the facility, most identification badges look alike, exactly the way they were manufactured months or years before. Thus, it is impossible for any individual to determine if any particular person in the facility is authorized to be at the facility by merely viewing the badge. This presents a serious security problem in public domain facilities where people can enter a facility without passing through an employee or visitor access control portal, e.g., hospitals, airports, museums, seaports, university facilities, libraries, and so on.

Applicant is not aware of any commercially viable secure solution to this invalid visual ID problem. One solution that has been proposed is to make the identification badge with an active or passive electronic display powered by batteries. It is also possible to have electronic contacts on the badge so that when the identification badge is read by the access control system, the badge displays information. However, this is expensive and impractical since there are many type identification badges that are incapable of being updated in such a manner.

For the past several years, the development of an image coding concept has been stalled due to the difficulties encountered in applying and removing the image code onto the various types of identification badges, particularly plastic badges. Any useful and secure coding system for identification badges must be capable of applying a large image code, e.g., an image code for a specific date, that can be clearly displayed on the identification badge and then subsequently replacing it with another image code, i.e., that associated with the next days image code. One attempted solution is to apply a separate label for each image code. However, it is cumbersome and impractical to apply an adhesive label to each badge, every day for each separate image code generated for that day. Additionally, such adhesive labels can be relatively easily removed and transferred to other badges creating a security issue.

One system that is used employs rewritable films manufactured by Ricoh and Mitsubishi Paper Mills of Japan. These rewritable films are constructed as part of the original badge or the rewritable film is added to the badge by applying it to the front surface as a pressure sensitive film. The image is created in the film by a thermal printing process by applying heat in a first heat-pass to erase the previous image code and then a second heat-pass to print a new image code. Although this system has certain applications, it is very complicated and expensive and difficult, for example, to modify all the employee badges at a facility or multiple facilities so that the system can be used. Additionally, such rewritable films can only perform for about 500 heating cycles before they must be replaced. Perhaps more important, when employing such a rewrite system the badges must be produced at a central location and are often used at a different facility that do not have the rewrite system and thus they cannot be updated with a new image code.

OBJECTS AND SUMMARY OF THE INVENTION

It is an object of this invention to provide a substantially universal process for applying coding images to any type or brand identification badge, particularly plastic badges or identification cards.

It is a further object of this invention to provide an image coding security system wherein each employee at a facility can readily determine if an identification badge that they observe is authentic and valid for a predetermined period of time, e.g., that day.

It is another object of this invention to provide a system of coding identification badges that offers substantial assurances for every employee that all the people in the facility are authorized to be there.

It is another object of this invention to provide a system that prevents people from using unauthorized Identification badges, such as terminated employee badges, counterfeit badges, expired employee badges, and stolen employee badges that may initially appear "visually" valid.

All of the foregoing objects of this invention and others are achieved by a process for validating an identification badge for a plurality of predetermined periods of time. The process comprises:

generating an initial image for an initial predetermined period of time;

transmitting the initial image to a printing device;

printing the initial image on the identification badge to thereby validate the badge for the initial predetermined period of time;

generating a subsequent image for a subsequent predetermined period of time;

transmitting the subsequent image to the printing device;

removing the initial image from the identification badge;

printing the subsequent image on the identification badge to thereby validate the badge.

In a preferred embodiment, the process includes imparting energy, such as infra red radiation, onto the card to remove the initial image printed on the card, generating the subsequent image for the subsequent period of time, and then transmitting this subsequent image to a printing device such as an ink jet printer. The ink jet device prints the image on the identification badge to thereby visually validate the badge for the subsequent period of time.

BRIEF DESCRIPTION OF THE DRAWINGS

Other important objects and features of the invention will be apparent from the following Detailed Description of the Invention taken in connection with the accompanying drawings in which.

DETAILED DESCRIPTION OF THE INVENTION

As used herein the terms identification badges or identification cards, or words similar thereto, are intended to include all types of identification documents and plastic and paper cards, including but not limited to, credit cards, bank cards, phone cards, passports, driver's licenses, network access cards, employee badges, tokens, fobs, debit cards, security cards, visas, immigration documentation, national ID cards, citizenship cards, social security cards and badges, certificates, identification cards or documents, voter registration cards, police ID cards, border crossing cards, security clearance badges and cards, gun permits, badges, gift certificates or cards, membership cards or badges, tags, CD's, retail promotion cards, consumer products, knobs, keyboards, electronic components, etc., or any other suitable items or articles that may record information, images, and/or other data, which may be associated with a person or brand identity, function and/or an object or other entities to be identified that requires a certain level of security, tamper resistance and may need to be repeatedly verified.

U.S. Ser. No. 11/315,112, filed Dec. 23, 2005, now pending ("the parent application") provides a means for printing visual image codes whereby the initial image code is hidden by laying down a hiding layer over the printed visual image before the printing of the subsequent image code occurs. An additional aspect now additionally disclosed and claimed in this application, is directed to a means for removing the previously printed initial image code rather than hiding the initial image code.

There are numerous specific image transfer systems and apparatus that can be used in this invention. For example, a first system employs a heat-activated adhesive transfer means. A second system employs a pressure-sensitive adhesive transfer means.

Figure 1:
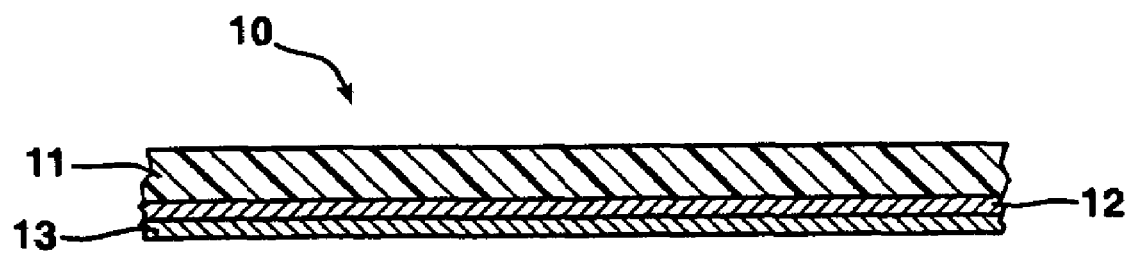
FIG. 1 is a cross section of a heat transfer ribbon used in the process of this invention.

Referring to FIG. 1, a thermal transfer ribbon 10 is provided having two layers 12, 13 coated onto a carrier substrate 11. The carrier 11 is typically 0.2 to 0.5-mil polyester. Layer 12 is the image forming layer while layer 13 is an opaque transfer layer used to cover the previous image remaining on the identification badge 21. Layer 13 is typically white, but it can be any color that makes it opaque, and it can also contain security modalities such as holographic images or reflective flakes.

Figure 3:
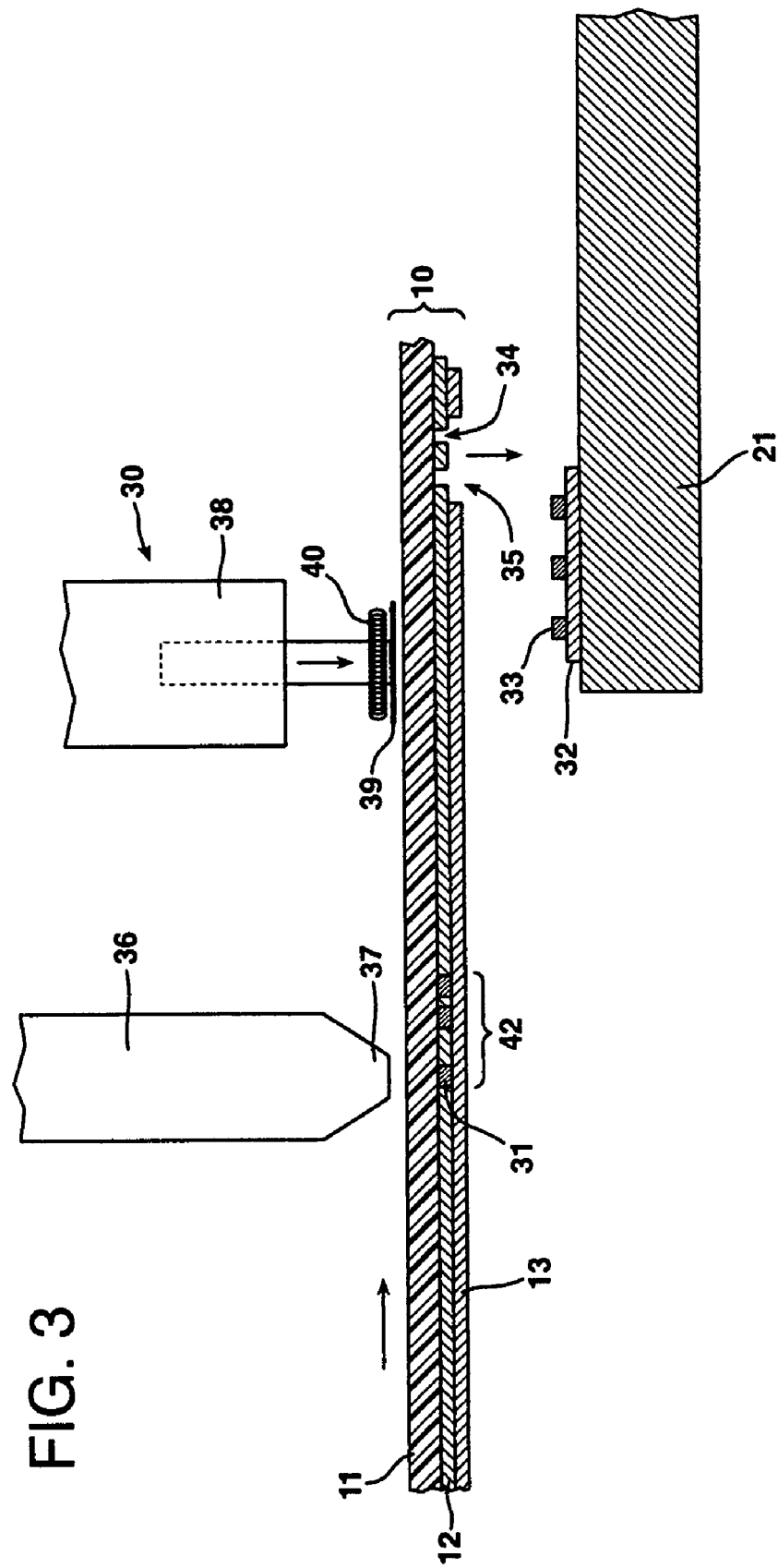
FIG. 3 is a schematic view of the printing system used in a process of this invention.

Referring to FIGS. 1 and 3, the function of the ribbon 10 is twofold. Firstly, it creates the image when the ribbon 10 passes under the thermal printing head 36. Secondly, the opaque image layer 13 acts as the base support for the image created in layer 12 and obliterates, covers-up or hides the previous image code 33. As shown FIG. 3, the thermal printer 30, does not print directly onto the identification card surface, but transfers an image from the ribbon 10 to the identification card 21 surface by application of an opaque transfer layer 22 thereto. Preferably the transfer layer 22 is not a rigid substrate but is a substrate that is non cohesive such that when removed from the identification badge 21 it crumbles and disintegrates making it impossible to transfer to another badge and when so removed leaves a tamper evident residue.

The mechanism by which the image is created depends on the specific thermal transfer ribbon construction. Layer 12 can be a colored ink which operates like standard thermal transfer ribbon. When the colored ink in layer 12 is heated, it melts and bonds to the opaque, e.g., white, base layer 13, so that when the base layer 13 is transferred to the plastic card 21, the base layer only carries the colored ink image with it, leaving the remainder of the colored ink, which was not heated, on the ribbon substrate 11. The heating temperature to melt the colored ink 12 is much higher than that of the heating temperature required to transfer the base layer 13 to the identification card 21, which is typically a plastic. Otherwise, all the colored ink 12 would be transferred with the base layer 13 when it is transferred.

In a second embodiment, layer 12 is a clear coating of thermal chemicals. Thus, when the ribbon 10 is heated by the thermal print head 36 only that portion of the thermal chemical directly affected by the heating elements 37 change colors, leaving the remainder of the thermal chemicals on the ribbon 10 in their original state, e.g., a clear layer. Thus when the base layer (13 in FIG. 1 and 22 in FIG. 3) is transferred to the badge 21 surface, the entire direct thermal coating layer 12 can be transferred with it instead of just the printed portion of the layer. By transferring both layers 12 and 13 to the identification card 21 as shown in FIG. 3, less accuracy is required for controlling the separation of the various coated layers on the thermal transfer ribbon.

Figure 2:
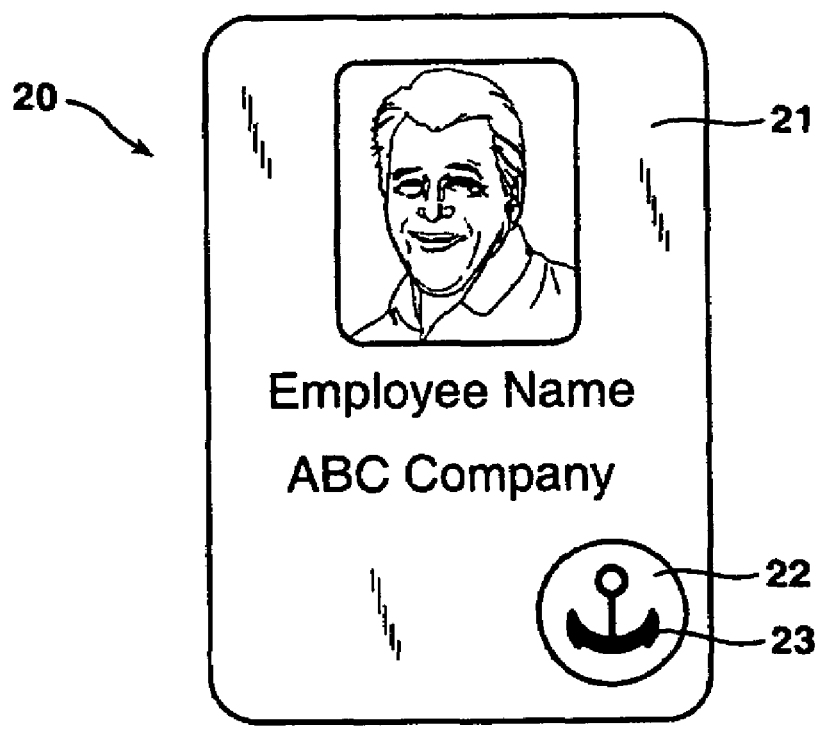
FIG. 2 is a front view of an identification badge that has been validated by the process of this invention.

Referring to FIG. 2, as a result of this process, the plastic identification card 21 preferably receives a randomly generated colored image code 23 when it is authorized by the validating unit for that day. The colored image code 23 is applied to the plastic card 21 on a white base layer 22, which adhesively attaches to, for example, the plastic identification badge 21.

Figure 4:
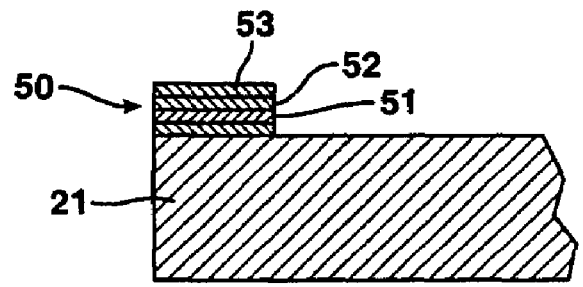
FIG. 4 is a cross-sectional view of an identification badge that has had a plurality of validations.

As shown in FIG. 4, the badge or card 21 may already have many image codes 51, 52 thereon that have been applied on previous days. The white base layer 22 will hide image codes directly below it from another day, as are the previously applied base layers hiding the respective image codes below them. However, because none of these applied layers have a rigid substrate, the entire mass of layers of resin 51, 52, 53 attached to the plastic card or badge 21 are difficult to remove in an orderly fashion so that it will make transferring these security image codes to another card difficult, if not impossible.

One of the primary benefits of this image code printing and transfer system is that the image code itself lacks a strong and cohesive support structure, thus making it more tamper resistant and when removed will leave tamper indicating evidence on the card or badge.

FIG. 3 depicts an example of one particular printing device for this image code coding system. In this device, ribbon 10 is transported through the printing device 30. The device consists of three parts: the thermal printing head 36, the image code transferring mechanism (solenoid) 38, and the identification card 21 which receive the image code. The ribbon 10 moves at a uniform speed and is in contact with the printing head 36. At the end of the head 36 is a linear array of individual heated printing elements 37 arranged to generate the image that has been transmitted to the head 36 and the pixel areas of the ribbon. If the colored component 12 of the ribbon 10 is a colored thermal ink, then the heat causes the colored ink to melt and bond to the white transfer coating 13 under it. If the component 12 is a direct thermal coating, then the heat causes the chemistry of the direct thermal coating to change color and remain bonded to the white transfer coating 13. In either case, the image code is created within the thermal transfer ribbon so that it can be transferred to the identification card 21 at the next station 38 of the printing unit.

This thermal transfer mechanism differs from conventional thermal transfer printing units in that in conventional thermal transfer printing the thermally created image is immediately and directly transferred to the receiving substrate, the printing process applying the melted colored ink directly to the receiving substrate. In this invention, the image is created within the ribbon before applying it to the substrate card.

Referring to FIG. 3, the printed image 42 is transported to the image transfer station 38 as the ribbon moves along it the path. A sensor detects this image and activates the solenoid 38 which presses the thermal transfer ribbon onto the identification card 21 which receives the image. A heater 40 on the transfer platen 39 melts the white base layer 13 to the extent that it separates from the contiguous coating and enables the white base layer to bond to the plastic surface of the identification card 21. Typically, the transfer platen 39 will be round so that alignment with the edges of the identification card 21 and underlying image codes is not critical. In particular, the transfer platen 39 is heated sufficiently to melt the white transfer layer, but not sufficiently to alter the image forming layer 12. For color thermal ink in layer 12, the heat is not sufficient to melt it and thus, only the image components melt and bond to the white base layer 13 from the print heat element 37 are transferred along with the white base layer 13.

Alternatively, if the image color forming layer is of the direct thermal type, the heat is not sufficient to convert the direct thermal chemistry. In this case, the transfer platen 39 only heats and transfers a round circle of both layers 12 and 13 onto the surface of the identification card 21.

Figure 5A:
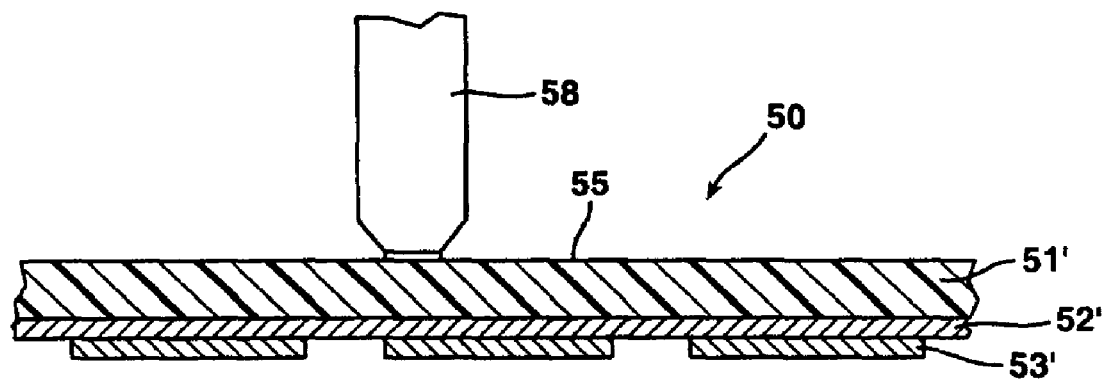
FIGS. 5A and 5B are schematic views of the printing station and ribbon used in the printing system for this invention.

FIG. 5A is a schematic representation of a preferred ribbon 50 comprising a polyester substrate 51', a color imaging coating 52' and a pressure sensitive adhesive 53' which is used to attach the color printed image 52' to the identification card. In this construction, the color forming image coating 52' can be either a thermal transfer ink or a clear direct thermal printing chemistry. The pressure sensitive adhesive 53' needs to be die cut in order that discrete circles can be transferred from the ribbon 50 to the identification card itself. The die cut circles 53' can be white, colored, or security composite adhesive materials, but they will need to be separate discrete units so that only one at a time is transferred to the identification card. Also, since the ribbon 50 could be self-wound, i.e., rolled onto itself, the top surface of the roll 55 will be silicone coated in order to act as a release liner. These self-wound rolls provide an easy means of dispensing the image code material.

Figure 5B:
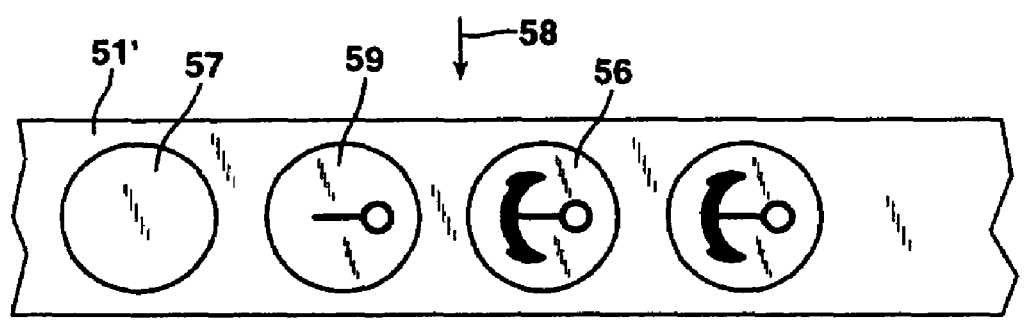

Referring to FIG. 5B, the die cut circles 57 of the imaging materials are transported through the printer mechanism by the web 51'. As the image circles approach the print head 58, there is no printing thereon. Under the print head, the heating elements 58 create the image as shown in 59 and upon reaching the point of application, the image has been fully printed 56.

Figure 6:
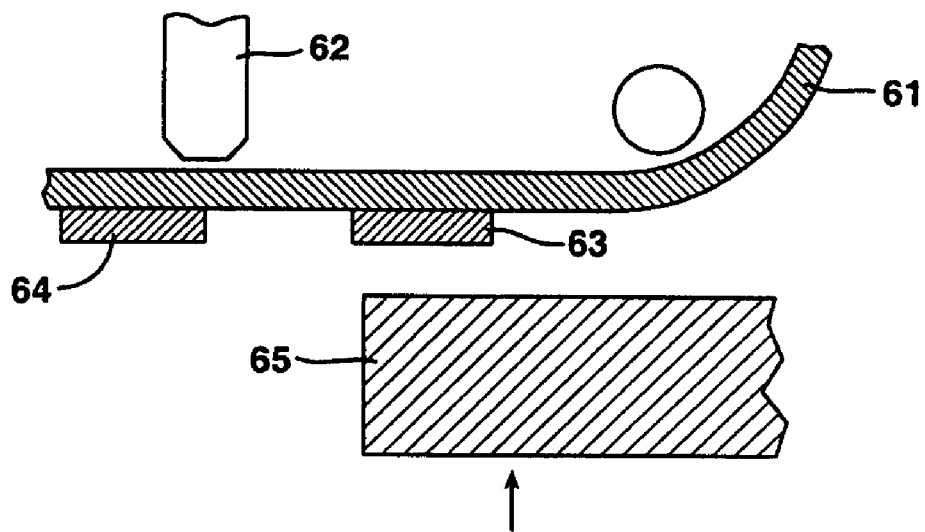
FIG. 6 is a schematic view of another embodiment of the printing station used in the printing system for this invention.

Referring to FIG. 6, at application point 63 the identification card 65 is contacted with the adhesive of the printed image code. This is accomplished by the card being inserted into a slot and pressed against the image code adhesive 63 which is on the web of the printing ribbon 61. When the card 65 is removed from the printing unit, image code 63 is attached to the identification card and the web 61 continues to the next image code material 64 to be printed.

Whereas there can be many designs for these image code printing units, they typically process the image code media in a similar manner by printing the image code, transporting the image code to an application station, and then transferring the image code to the card itself. Other designs where the image code is printed and applied at the same location are possible with more complex mechanisms. Since the image code media has no substrate but only a weak resin matrix to keep it intact and to keep the image unaltered, it would be difficult to have the image code media pass through intermediate transfer mechanisms.

As mentioned previously, this image code application process enables any identification card to be marked with image codes and does not require any special card material. The functional and marketing benefits of this are substantial. A second benefit of this image code processing system is that the image code itself posses better security than employing a labeling system with a substrate for the image code. Since single layers of the image code media cannot be removed intact, image codes can only be transferred by lifting off multiple layers of media where the increased bulk of these multiple layers produces enough strength within the material mass so support the top, most current image code. Image codes below the top layer will be impossible to separate from the mass. In addition, if one simply squeezes the mass of transfer material between their fingers, the image code image will be crushed and destroyed because there is no substrate to protect its integrity. Furthermore, it will be very difficult to strip out a single layer of media containing an image code because each layer has very little integrity.

One additional operation factor that is important is the speed with which the image code can be applied to an identification card or badge. When the image code processing system requires that an entire identification card be transported into and out of the printer mechanism this process requires 10 seconds or more. It also means that the printing mechanism is subject to contamination and damage from the identification card passing there through. By only printing and applying the image code itself, both of these problems are avoided. The image code application process described in this invention, can be speeded up to one or two seconds. It is also possible to apply the image code to any portion of the card as opposed to only being able to apply it to a specific, limited location on the card.

The printing process of this invention produces a large, dark, high resolution symbol that replaces or covers up or eliminates the previous symbol. It can print on any type of identification card or badge without damaging the card. The cycle is relatively rapid, e.g., 1-2 seconds after insertion of card, is completely automatic and permits the application of subsequent symbols or indicia for different time periods.

More specifically, the printer should have the following characteristics:

Logic Inputs to unit: Low voltage input line
Power requirements: 120/240 volts; 50/60 Hz
Installation: A freestanding unit can be placed anywhere
Panel mounted unit installed per specs
Size of unit 12"×12"×12" max
Ribbon capacity: about 100 feet
A sensor to alert an operator that ribbon needs to be changed after a predetermined amount of symbols are printed.
Cycle time for printing & applying a symbol: 1-2 seconds
Average time to insert and retrieve their Identification badge: 2-5 seconds
Maximum number of cards validated per hour: 360 people per hour
Size of symbol: 0.5" to 0.75"
Size of white base coat for hiding previous symbol: $\frac{1}{16}$" all around maximum size of symbol
Color of symbol printing: Black
Ribbon construction: Two layers coated on 0.1-0.5 mil polyester ribbon:
Symbol forming middle layer: either direct thermal chemistry or thermal transfer ink; white base layer is heat activated adhesive which, when transferred to the plastic card, carries the colored image printing from the middle layer with it.

Figure 7:
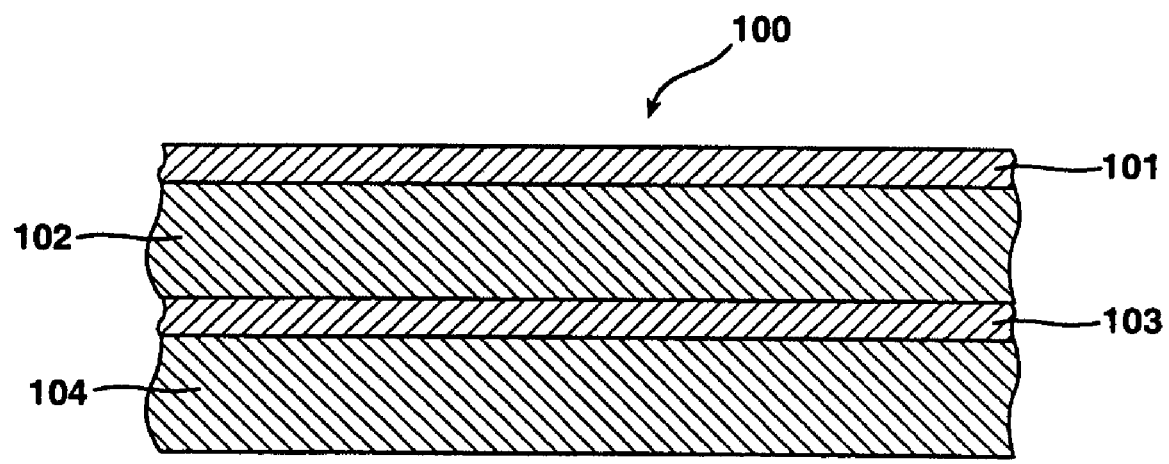
FIG. 7 is a cross section of another type heat transfer ribbon used in the process of this invention.

Referring to FIG. 7, which is a cross section of an embodiment of a heat transfer ribbon used in the process of this invention, the ribbon 100 comprises a film carrier material 102 which is a polyester film of about 0.25 to 0.5 mil thickness. On top of this film carrier material 102 is a thin low friction slip layer 101, which permits the ribbon 100 to easily slide over the print head. The ribbon 100 further includes a colored printing layer 103 and a white opaque layer 104 for overlaying and hiding any images or colors that were previously on the identification badge or card. The white opaque layer 104 on the lower side of the ribbon 100 is transferred and pressed onto a substrate, for example a plastic identification card or badge. The white opaque layer 104 adheres by pressure and heat means to the substrate. The white opaque layer 104 carries with it the black ink image 103 as it is stripped away from the film carrier 102. Thus, the white layer 104 and ink layer 103 are stripped from the film carrier material 102 as a combined unit as the ribbon is transported through the printer. The image or code was created in the ink layer 103 upstream from its transfer in the transport path of the ribbon 100 and positioned under the transfer solenoid platen by any of a number of types of sensing devices.

The materials used in the ribbons are known in the art. The materials commonly used are polymers, waxes, additives, tackifiers, fillers and pigments. Other layers could be incorporated into the ribbon such as release layers that allow easy release of each layer from the ribbon. There can be a release layer between the black ink layer 103 and the white opaque layer 104, or there can be a release layer between the black ink layer 103 and the ribbon substrate 102. These release layers can be composed of low melting point polymers, waxes, silicone-based resins, Teflon type materials, etc., that are well known in the art.

One embodiment of a two layer thermal transfer ribbon is similar to that of a conventional single ink layer thermal transfer ribbon. In this embodiment, the ribbon comprises a 0.25 mil polyester ribbon film (Toray Plastics America, Inc; Toray Industries, Inc.) That contains a slip layer coating 101 on one side. On the opposite side of the ribbon film is a coated (2 lbs./ream) black thermal ink layer 103, and the second layer is a white opaque (hiding) layer 104 (5 lbs./ream). The white opaque layer 104 and the black ink layer 103 transfer to the plastic card substrate by heat and pressure from the applicator solenoid and are released from the film substrate 102 after the solenoid platen lifts. The black thermal ink layer 103 and a possible release layer (0.1 lbs./ream), is bonded to the white opaque-layer 104 by the linear pattern heating performed by the print head heating elements prior to the combination being transferred by the solenoid platen to the identification plastic card substrate. Release layers of this type are well known in the art.

The following is a description of the preferred elements of a preferred ribbon:

| Layer | % by weight | Component Name |
|---|---|---|
| Black Ink | 5 | Daran SI.143 (PVC, Tg—15 C.) |
|  | 38 | Vycar 352 (vinyl emulsion, Tg = −62 C.) |
|  | 6 | Hycar 1561 (acrylonitrile, Tg = −19 C.) |
|  | 25 | Tint Ayd NV7345 (black pigment dispersion) |
|  | 26 | Vycar 151 (vinyl emulsion Tg = 85 C.) |
| Release | 95 | Teflon PTFE-35 |
| Layer | 5 | Vancryl (acrylic Emulsion Tg = 5 C.) |
| White Opaque | 60 | Tint Ayd NV7003 TiO2 dispersion |

-continued

| Layer | % by weight | Component Name |
|---|---|---|
| Layer | 30 | Hycar 26288 (Acrylic emulsion Tg = 25 C.) |
|  | 10 | Water |

Vycar & Hycar trademarks of Noveon Inc
Daran trademark of W.R. Grace & Co
Tint Ayd trademark of Elementis Specialties Inc
Teflon Trademark of E.I. du pont de Nemours & Co
Vancryl trademark of Air Products & Chemicals Inc The inventions described herein provide a practical means of adding visual data and designs, i.e., an image code, to an identification badge. In order to be practical, the image code must be able to be changed each day, but the printing cannot be permanently attached to the identification badges. The image code must be temporary, and yet it must be sufficiently durable to last for the authorized time interval such as a day or several days. It must also be able to be replaced by a subsequent image code for the next time interval. Thus, simply printing data or designs over the previous data or designs would not be practical because the previous image code would continue to be visible underneath. A hiding layer is required. Also, the identification badge or card itself may have been manufactured in a dark color like black or brown which would make the printing impossible to see. Thus, a light color is required. Hence, providing a practical printing means precludes the use of standard printing techniques. Note that whereas almost any printing device can print a white hiding layer before it prints a dark image layer, such a complicated printing device and/or procedure is impractical.

There are a number of conventional printing techniques that could be employed in printing the image codes onto cards. These include ink jet printers, laser printers, thermal transfer printers, impact printers with ribbons, electrostatic printers. As pointed out earlier, most of these printing processes are designed for printing on thin, flat label stock, and one may be able to adapt them reliably and trouble-free to print on the flat face of cards of various thicknesses.

In another embodiment of the invention wherein new image codes can be repeatedly printed in the same area on identification cards, a removal system is provided to remove the initial printed image code, and a printing system is provided to apply the subsequent image code.

The removal system is designed to remove, for example, printing ink, by imparting enough energy (e.g., heat, mechanical energy) to the ink molecules to create a separation from the card surface, but not cause damage to the card.

In order to remove the initial image code of printed ink, there are three required steps:

1) Break the physical attachment (non-covalent bonds) between the ink particles and the substrate;

2) Remove the particles (molecules) from the substrate surface; and

3) Dispose of the removed particles, such as by capturing them in a filter.

In another embodiment, liquids can be used to dissolve or interlace between the ink and the substrate. However, such a removal process can complicate the subsequent printing process. Such a system would also require several consumable supplies and substantial maintenance.

Non-liquid removal systems are thus preferred, with removal systems that impart a sufficient amount of energy for removal being preferred, for example:

1) Mechanical brushes (scrap-off)

2) Ultrasonic fracturing and pulverizing to fine particles with air/brush removal (breakup & mechanically remove) or adhesive film removal.

3) Application of heat or radiation by various means, that also employ specifically designed inks for easy removal:

a) Heat to cause sublimation (evaporation-off) of the ink as a vapor
   b) Heat to weaken the bonds plus air/brush (heat plus mechanical removal)
   c) Heat which releases gas bubbles to fracture and lift ink off the substrate (heat plus ablation)
   d) Heat to weaken the bonds plus mechanical pick-up to remove the printing ink such as using suction to pick-up the ink or use of a ribbon (the printing ribbon or a second ribbon with adhesive to pick-up the ink from the substrate surface).

This invention contemplates printing the visible image codes using many different printing techniques and their corresponding inks, for example, thermal transfer inks, dye sublimation inks, offset inks, flexographic inks, toner inks, ink jet inks and hot-melt solid inks. In order to provide an ink that performs properly in the printing and removal process, various formulas for inks can be used. In general, the printing ink must be capable of being easily removed from the card, yet durable enough not to come off during the useful life of the card.

Table 1 herein presents a typical formula for an ink jet ink that is easily removed by mechanical brushing. This ink has little binder to hold the pigment particles together so the mechanical brushes can fracture the ink film for easy removal.

Table 2 herein presents a typical formula for an ink jet ink that employs sublimating dyes dissolved in a low molecular weight solvent which will vaporize when heated to above 80 degrees C. By applying sublimating dyes with little else (i.e., resin) in the ink, all molecular components will vaporize when the dried ink is heated for removal.

Table 3 herein presents a typical formula for an ink which only weakly bonds to the plastic card surface. In addition, the binder in the ink becomes brittle when dried so that strong vibration from ultrasonic transducers will cause it to break up into micron size particles.

TABLES

All percentages are in weight percent.

Ink formulas are approximate and for descriptive reference only.

TABLE 1

An inkjet ink that has low cohesive and low adhesive properties that is able to be removed from an identification card by mechanical means, such as with brushes or sandpaper from the substrate.

45% Printing ink lacquer diluents
25% Carmona Corp Printex 35 carbon black
10% Toluene
10% Shell Kraton 1107 (rubber resin)
5% Reichold Chemical Co Nirez 2040
5% Calcium carbonate (Georgia marble Co G-S80)

TABLE 2

An inkjet ink that is brittle (binderless) which can be removed by ultrasonic shock and brushing off the surface of the substrate.

40% 2-heptanone
25% water
10% Methyl alcohol
10% 1-decene
10% sodium lauryl sulfate
5% Victoria Blue FGA dye

TABLE 3

A dye sublimation inkjet ink that can be removed from the substrate by heating to cause sublimation and to leave little or no residue.

60% Keystone Sublaprint Red 70011-M sublimation dye or equivalent
20% Jon Cryl 624 resin binder
15% Water
5% Henkel 4010 defoamer

TABLE 4

An inkjet ink that has good cohesive properties to form a film so that when heated, the film can be lifted off the surface by adhesive or suction means.

27% Zinc oxide powder (particle size 0.04 mu.m)
23% Toluene
21% Isopropyl alcohol
18% Polyethylene glycol 1#4000
11% Azo black dye (KST Black KR, Nippon Kayaku Co, Ltd.)

Several printer designs will be described which remove the printed image code by imparting energy into the ink particles so they separate from the substrate and can be blown off the surface with a jet of air.

As previously discussed, the goal is to print onto the face of an identification card a new image code, usually each day. This image code must be large and clearly visible, having sufficient contrast with the background of the card to be seen from a distance.

Thus, the printing devices used in this invention must provide at least four functions:

1) a means for inserting and positioning the plastic card in the printer;

2) a means for detaching or separating the previous printing ink from the plastic card surface;

3) a means for removing and disposing of the detached printing ink within the printing device; and 4) a means for applying a new image code to the surface from which the printed image code has been removed.

Figure 8:
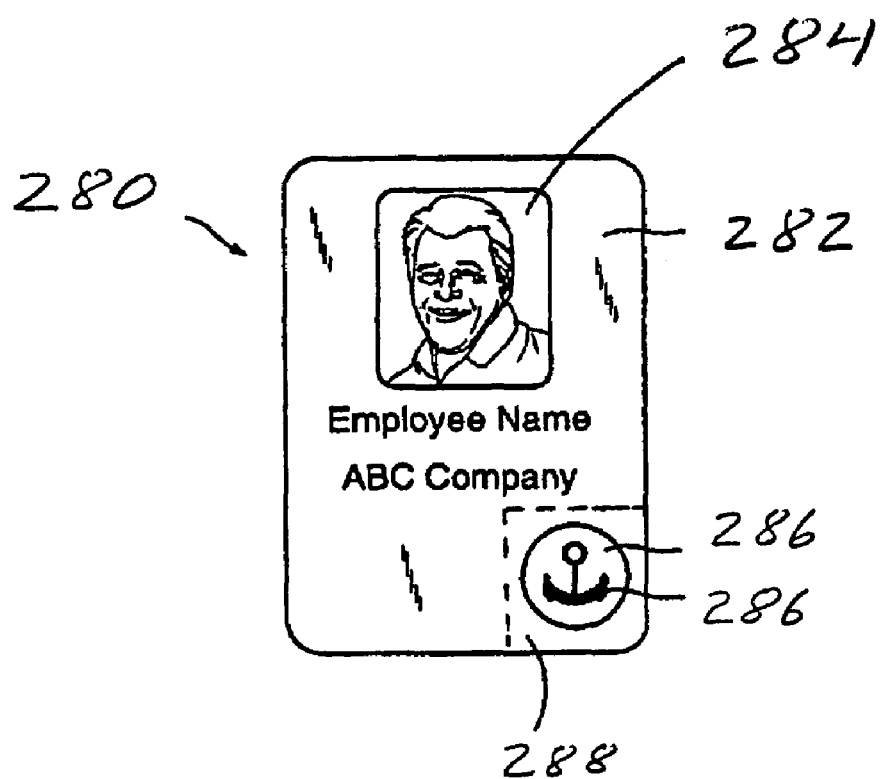
FIG. 8 is a front view of an identification badge that has been validated with an image code by the process of this invention.

FIG. 8 is a typical identification card 280 made of polyvinylchloride or polyester. The card usually has a thickness between 10 and 30 mils. The design of the data on the card typically provides for a photograph 284 of the person at the top along with security data 282 on the face of the card. The validation image code 286 is updated at periodic times, e.g., daily, and overlays a white area 288 that is provided for the image code 286. An important factor in employing validation symbols on any identification card system is that the same area, such as 288, is "reserved" on every card 280 to accommodate the image code 286 to be printed thereon. Even if the identification cards are foreign to the facility's standard card that they manufacturer, the same area, such as the lower left or lower right quadrant is designated for the image code printing 286. This makes it easy for all employees and security personnel to know exactly where to look for the day's valid image code.

Figure 9:
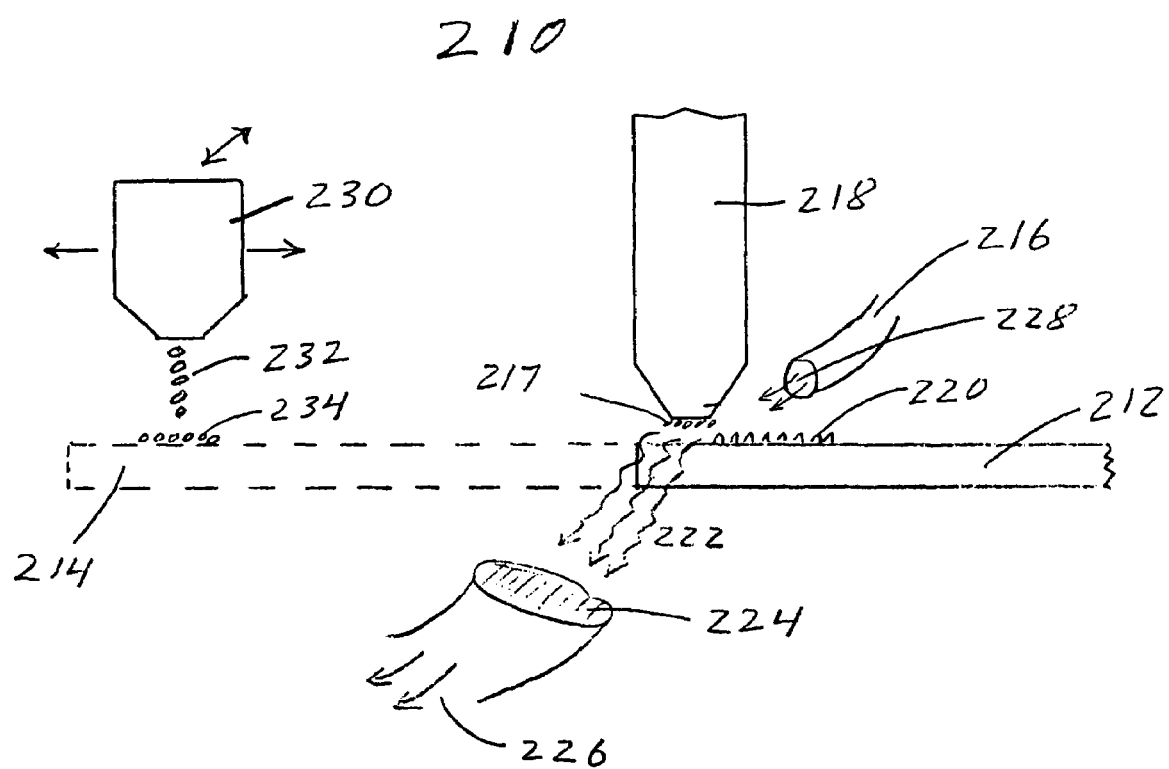
FIG. 9 is an ink jet printer for applying image codes to an identification badge, e.g., a plastic badge, after removing the previous image code by turning it into fine particles with an ultrasonic transducer.

As shown in FIG. 9 the printing device 210 has a slot into which the plastic card 212 can be inserted to a first position for removing the initial image code printing ink 220. In this embodiment an ultrasonic transducer 218 is located above and in contact with the printing ink 220 so that upon application of electrical power to the transducer 218, ultrasonic energy is imparted into the printing ink layer 220 on the face of the plastic card 212. Typically these plastic cards are constructed of a strong material, such as PVC or polyester, that does not disassociate or fracture from the required level of ultrasonic energy applied by transducer 218 to remove the image code.

Such ultrasonic transducers are manufactured by Herrmann Ultrasonic Inc and by APC International Ltd. These transducers are typically made of ceramic materials, such as lead zirconate titanate and can be configured to almost any shape. Typically, such transducers operate at frequencies between 25 and 40 KHz. However, their range can be extended in either direction. The wave form of the ultrasonic energy used for initiation of removal may be full wave, half wave, or continuous wave. It is estimated that the power required to fracture and pulverize the dried ink layer will be between 0.2 to 0.5 watts per square centimeter. However, the actual transducer to be used will depend on many factors such as the transducer design, the card materials, the ink formulation, the coating thickness of the ink, the time permitted to pulverize the dried ink layer, the size of the area of the printed image code, the potential damage to the card and other factors. For solid PVC or polyester cards, the ultrasonic energy can be easily tuned so as not to damage the card materials. However, for electronic cards that contain electronic chips, antennas, solder connections, and electrical contacts, care must be taken not to damage any of the components of the card.

Figure 11:
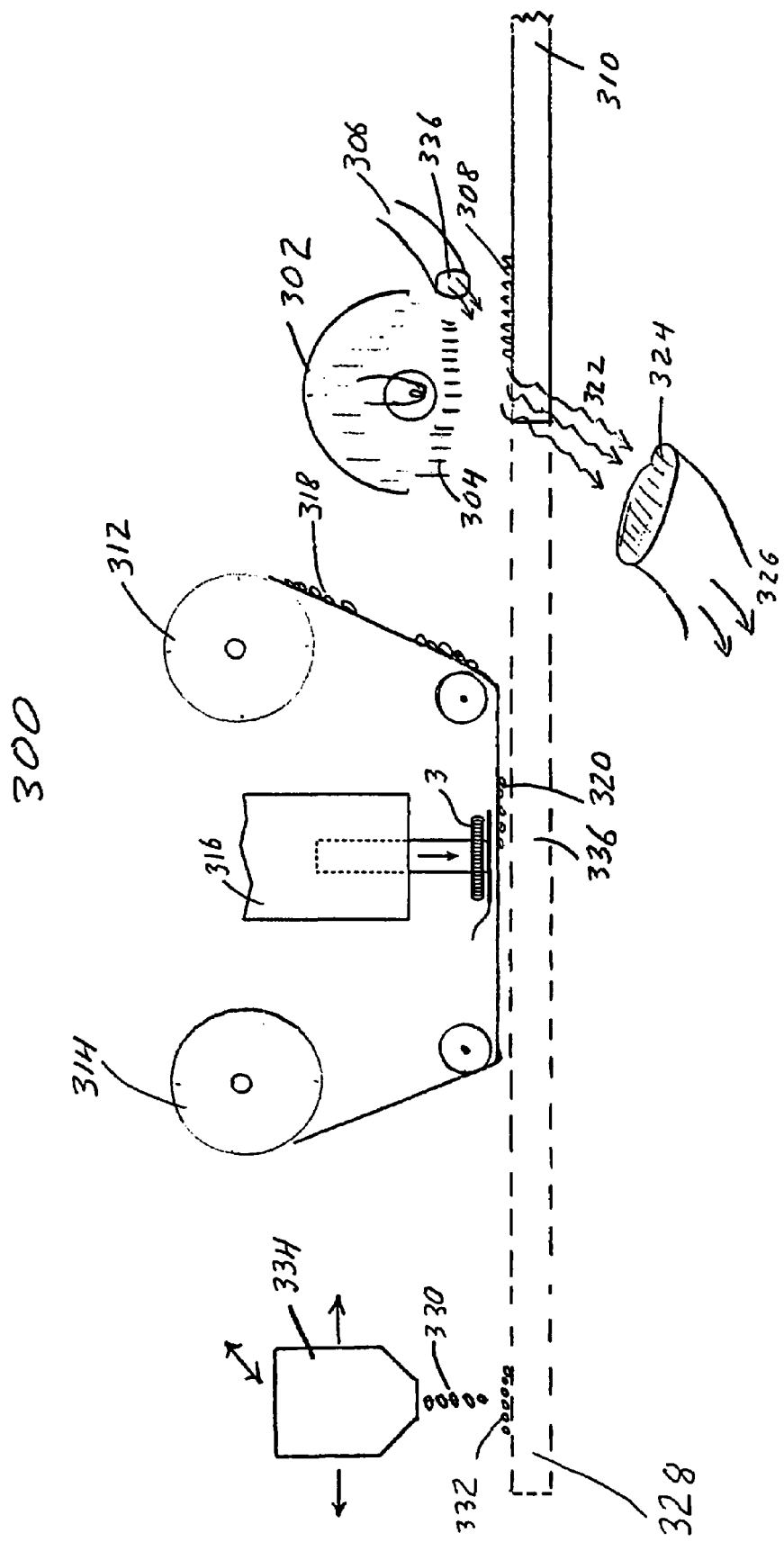
FIG. 11 is an ink jet printer for applying image codes to an identification badge after removing the previous image code by applying heat to soften and weaken the bonds of the ink film on the card surface and then pressing an adhesive type ribbon onto the ink for removal. The adhesive type ribbon also prepares the card surface for the next image code.

The ultrasonic energy applied or directed to the printed image code should be of sufficient frequency and strength to fracture the printing ink layer 220 into minuscule or micron size particles 222 which can be removed from the plastic surface by a jet of air 228 directed onto the card surface by the air tube 216. The size and location of the air jet system 228 and the amount and velocity of the air put through the system 228 his dependant on the particle size created by the ultrasonic system 218 to be blown from the surface of the card 212. As shown in FIG. 11, an alternate means of removing the ink particles 220 after separation from the card 212 is by an adhesive film 320. This mechanism would preclude the need for the air vacuum system 226, 216 described in FIG. 11.

Still referring to FIG. 9, the removal system must also be designed to accommodate a vacuum system 226 and associated air filter 224 to withdraw and capture the micron size ink particles that are produced by the ultrasonic process. It may be necessary to also provide a mechanism to move the ultrasonic transducer 218 over the card 212 to achieve optimum fracturing of the ink from the card 212.

Subsequent to removing the image code 220 and preparation of card surface area on which the image code is printed, the card 212 must be repositioned under the ink jet printer 230 for printing of the subsequent image code in such area. Such repositioning can occur by either moving the plastic card 212 from its initial position under the transducer 218 to its new position 214 or by moving the cleaning mechanism 218 away from the card 212 and the printing mechanisms 230 over the card 212. In either case, the ink jet printer 230 provides the proper horizontal x-y motions in order to have the printing head 230 directly print the ink 232 for the new image code 234 onto the face of the plastic card 212. It may be desirable for ergonomic or design considerations to maintain the plastic card stationary and have the various mechanisms in the printer move.

Figure 10:
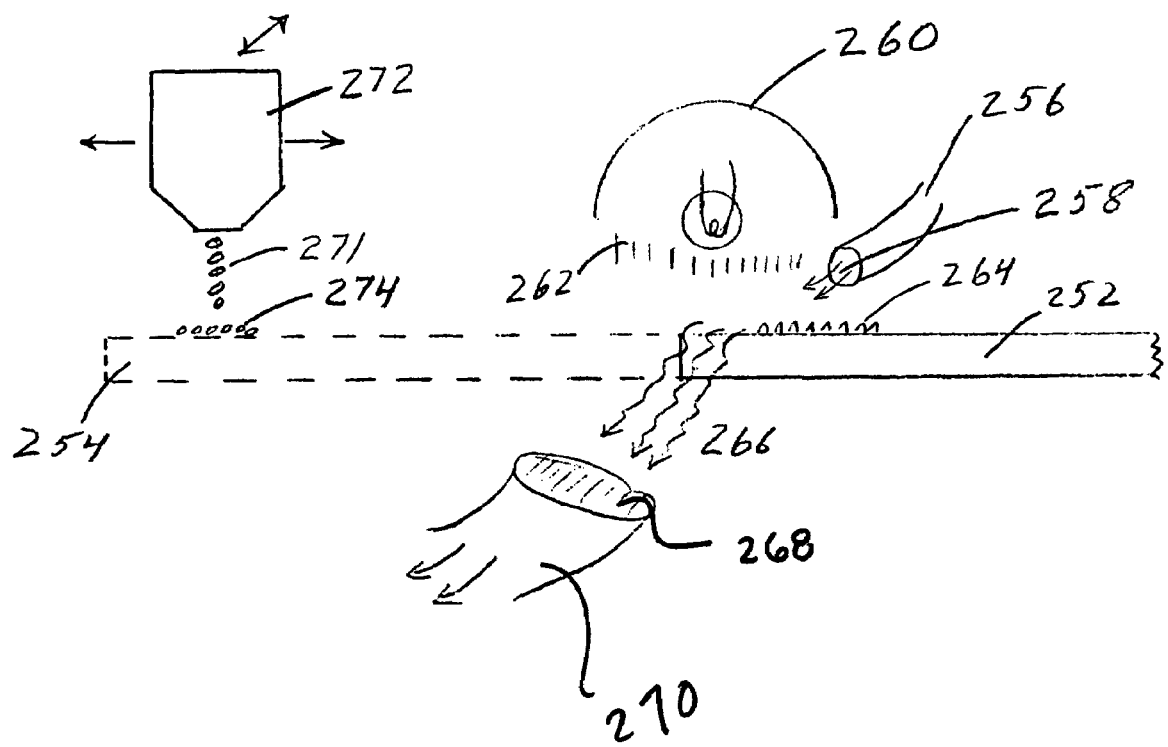
FIG. 10 is an ink jet printer for applying image codes to an identification badge after removing the previous image code with electromagnetic radiation or heat that causes the ink to vaporize into the atmosphere when the dye molecules of the ink sublimate, leaving little or no residue on the card surface.

FIG. 10 shows another embodiment of the image code removal and printing means. In this embodiment the card 252 is inserted into a slot which positions the printed image code area under a radiation energy source 260 which does not necessarily have to be in intimate contact with the surface of the plastic card 252. The energy source 260 produces radiation 262 by any of a variety of means, e.g., infrared heat by a thermal emission source, intense light from a laser, or microwave radiation with heat-producing energy. The energy source 260 imparts sufficient energy to the printing ink layer 264 on the front surface of the card 252 to vaporize the ink molecules so that they become airborne. These particles are then removed by the air jet 258 which is directed onto the card surface by the air tube 256. In the same manner as in FIG. 9, the molecular vapors of ink 266 are removed and carried from the card surface 252 by a vacuum system 270 with appropriate filters 268 that captures the molecular ink particles 266 that are produced by the vaporization process. The positioning of the plastic card 252 is important because after the cleaning process that prepares the printing surface for additional Image code printing 274, the card 252 or the ink jet printer 272 must be repositioned so that the inkjet ink 271 is directly onto the appropriate area 274 of the plastic card. Again, this repositioning of the card 252 for subsequent printing of the new image code 254 can occur by either moving the plastic card 252 from its initial position to its new position 254, or it can be accomplished by moving the cleaning and printing mechanisms 260, 272. In either case, the ink jet printer 272 provides the proper horizontal x-y motions in order to have the printing head 272 direct the ink 271 onto the face of the plastic card into a new ink image code pattern 274.

FIG. 11 shows yet another embodiment of the removal system and printing system that can be used in this invention. In this embodiment, the card 310 is inserted into a slot which positions the image code printing area 308 under a radiation energy source 302 which is focused on the printing area of the surface of the plastic card 310. The energy source 302 produces radiation 304 by any of a variety of means, such as infrared heat from a thermal emission source, intense light from a laser, or microwave radiation with heat-producing energy. In all these cases, the energy source 304 imparts sufficient energy to the printing ink layer 308 on the front surface of the card to heat the ink molecules so that their molecular attraction to the card surface is weakened or broken completely. The loosened or airborne ink particles are removed by the air jet 336 which is directed onto the card surface by the air tube 306. In the same manner as shown in FIGS. 9 and 10, the fine particles or flakes of ink 322 are carried from the card surface 310 to a vacuum system 326 with appropriate filters 324 provided to withdraw and capture the ink particles 322 that leave the card surface 310. Additionally, the heated ink film 308 may still be loosely bound to the plastic card surface 310. The card is then repositioned 336 so that the image code printing area is under an ink removal ribbon 320. The ink removal ribbon 320 is a thin film with a light coating of adhesive on its surface. New ribbon is fed from the supply spool 314 to the take-up spool 312 so that as ink is lifted off the plastic card surface 310 by the ribbon 320, the ribbon is advanced carrying with it the ink film 318 from the previous cards. In operation, the adhesive surface of the removal ribbon 320 is facing the image code printing area 336 and the ribbon 320 is pressed downward onto the card surface and lifted therefrom by a solenoid 316. This effectively lifts off all the ink from previous image code printing and prepares the surface of the card 336 for printing the subsequent image code. Depending on the performance of the ink 308, it may be possible to remove all the disassociated ink with an adhesive ribbon 320 and hence eliminate the air vacuum system 306, 326. If an ink formula is selected that produces a cohesive film after heating by the energy source 302, the entire film 320 could be lifted off the surface of the plastic card 310 without residual particles or fragments remaining on the card.

The next step is for the card 328 to be repositioned so that the ink jet ink 330 from the ink jet printer 334 is directed onto the appropriate area 332 of the plastic card. This repositioning can occur by either moving the plastic card from its previous position 336 to its new position 328, or it can be accomplished by shifting one or more of the other stations 334, 316. In either case, the ink jet printer provides the proper horizontal x-y motions in order to have the printing head 334 direct the ink 330 onto the face of the plastic card into a new ink image code pattern 332.

The process shown in FIG. 11 for removing and printing image codes on identification cards provides a clean and fast printing device. In particular, cards that may contain dust or other contamination can be effectively prepared for printing so that the printing ink produces a good quality image and has good binding to the card for durable use. It also provides a simple mechanism for maintenance since all the supplies required can be inserted into the unit all at one time.

Thus in summary, this invention provides a clearly visible printed image, text or symbol, on all employee, contractor and visitor identification badges entering a facility for daily visual validation of each person. The printer creates and applies, automatically, the image code onto all types of identification cards presented on a daily basis, the printing device receiving its data and commands from the facilities security access computer, which may or may not be, associated with other facility computer systems. Within an access controlled facility, this image code system provides a distinct visual image display on each person's identification badge to show that each person's identification badge has been checked for authenticity and validity. This system can be used with any identification badge system, and it can be used for any indoor or outdoor electronically controlled access area.

More specifically, the inventions described herein provide one or more of the following practical benefits/options and/or applications for printing durable, reusable image codes on identification cards or badges:

1. The printing does not use a substrate, so it is not transferable. The ink is printed directly onto the card surface.

2. The printing can be any data or design, so one can provide a computer generated image code that is unique and unpredictable.

3. The card receiving the printing can be reused as many times as desired until it is physically worn out.

4. The printing inks require no exotic materials nor does the substrate have to be treated before printing, so it is relatively low cost 5. Because the printing is computer generated, it can be applied to the card rapidly thus providing a fast and convenient operation 6. The image coding of the card only needs to be performed once a day upon entering the facility or once a time cycle because it would remain clearly visible and valid during the time interval of use.

7. The printing would be attached tightly to the face of the card so that it will be sufficiently durable to perform its function during the desired time interval yet could be removed the printing device before reprinting.

8. Print the sequence number for people queuing in a line provides number sequence for passengers waiting to board airplanes without assigned seat numbers; sequence numbers for any other first come, first serve(time predicated) function.

9. Validation of Promotion/Discount Card/Season Passes—Shows all personnel in a retail store or event that the card is valid and can be used today. This is particularly valuable when season passes and other high-value cards are counterfeited.

10. When an employee enters an access control portal of a facility, the system can perform a biometric verification of the person submitting the particular identification card and thus, by applying an image code to that particular card, it shows that the person wearing the card is absolutely the person identified by the identification card. An additional benefit of the printing for identification cards by this invention is where the manufactured identification card does not show the persons name, etc, so the printing can display the persons name or other vital information to make it visible on the face of the card.

11. If the card is an RFID card then the person's location or access points can be determined from a distance without card contact. This would provide real time monitoring of the individual as if the individual themselves would have an electronic chip implanted in them. Since these RFID cards are expensive, temporary printing on the card would serve as security for assignment purposes.

12. In the case of retail and so called 'loyalty' cards, a person could use the card for an entire day by having the proper image code printed on the card at the first use of the card in a retail store where the person's 'card' and biometric data are confirmed or the person shows suitable identification to satisfy the retail agent that the retail card is actually theirs.

13. As employed with retail cards described above, recently introduced contactless credit and debit cards do not require that the user provide a signature or any other proof of ownership of the card. This card may be used at many retail stores in a shopping mall or the like for the credit transaction. If the card was recently stolen, and not yet reported as such, then the contactless card could be used to steal a considerable amount of merchandise. In this situation, the first retail store register to accept the card could perform a biometric or other identification 'proof' exercise to confirm ownership by that particular individual and then print an authorized image code on the card so that all retail stores in the mall could accept the contactless card with confidence.

While various changes may be made in the detailed construction and processes of this invention, it will be understood that such changes will be within the spirit and scope of the present invention. Having thus described the invention in detail, it is to be understood that the foregoing description is not intended to limit the spirit and scope thereof. What is desired to be protected by Letters Patent is set forth in the appended claims.

What is claimed is:

1. A process for validating an identification badge for a plurality of predetermined periods of time executed by a security system, the process comprising:
   providing an identification badge to be worn by a person for other people to see;
   generating a random coded initial image associated with an initial predetermined period of time;
   transmitting the initial image to a printing device;
   printing the initial image on the identification badge to thereby validate the badge for the initial predetermined period of time, the initial image being of sufficient size to be seen by the other people when the badge is worn by the person;

mounting the badge on the person to permit the badge to be seen by the other people;

after the initial predetermined period of time, generating a subsequent random coded image associated with a subsequent predetermined period of time;

transmitting the subsequent image to the printing device;

removing the badge from the person;

removing the initial image from the identification badge;

printing the subsequent image on the identification badge to thereby validate the badge for the subsequent predetermined period of time, the subsequent image being of sufficient size to be seen by other people when the badge is worn by the person, remounting the badge on the person to permit the badge to be seen by other people.

2. The process of claim 1, wherein the removing of the initial image step is an energy dispersive cleaning process.

3. The process of claim 1, wherein the removing the initial image step is an abrasive cleaning process wherein the initial image is abrasively removed from the identification badge.

4. The process of claim 1, wherein the removing the initial image step is a mechanical abrasive cleaning process wherein the initial image is abrasively removed from the identification badge.

5. The process of claim 1, wherein the removing the initial image step is a liquid cleaning process.

6. The process of claim 1, wherein the removing the initial image step is an abrasive liquid cleaning process wherein the initial image is abrasively removed from the identification badge.

7. The process of claim 1, wherein the removing the initial image step is a liquid cleaning process wherein the initial image is dissolved from the identification badge.

8. The process of claim 1, wherein the removing the initial image step is an ultrasonic cleaning process wherein the initial image is ultrasonically removed from the identification badge.

9. The process of claim 1, wherein the removing the initial image step is an electromagnetic radiation cleaning process wherein the initial image is electromagnetically removed from the identification badge.

10. The process of claim 1, wherein the printing device is an ink jet printer that applies an initial and subsequent printing ink image and the removing the initial image step includes converting the initial printing ink image into fine particles with an ultrasonic transducer.

11. The process of claim 1, wherein the printing device is an ink jet printer that applies an initial and subsequent printing ink image and the removing the initial image step includes vaporizing or sublimating into vapor the initial printing ink image with electromagnetic radiation or heat.

12. The process of claim 1, wherein the printing device is an ink jet printer that applies an initial and subsequent printing ink image, the ink bonding to a surface of the identification card, the removing the initial image step comprising:

heating the initial image to weaken the bond of the printing ink with the identification card surface; and removing the initial image from the identification card surface.

13. The process of claim 1, wherein the printing device is an ink jet printer that applies the initial and the subsequent image as a printing ink image, the ink bonding to a surface of the identification card, the removing the initial image step comprising:

heating the initial image to weaken the bond of the printing ink with the identification card surface; and lifting the initial image from the identification card surface by providing a ribbon having an adhesive surface thereon, applying the adhesive surface to the initial image, the initial image adhering thereto, and lifting the ribbon therefrom to remove the initial image.

* * * * *